ERROR DETECTING SYSTEM FOR A DIGITAL COMPUTER

Filed Aug. 5, 1958 2 Sheets-Sheet 1

INVENTORS
DONALD A. HARRISON
JAMES J. SELFRIDGE
BY Edgar H. Kent
ATTY.

May 29, 1962 D. A. HARRISON ET AL 3,036,770

ERROR DETECTING SYSTEM FOR A DIGITAL COMPUTER

Filed Aug. 5, 1958 2 Sheets-Sheet 2

INVENTORS
DONALD A. HARRISON
JAMES J. SELFRIDGE
BY Edgar H. Kent
ATT'Y.

United States Patent Office 3,036,770
Patented May 29, 1962

3,036,770

ERROR DETECTING SYSTEM FOR A DIGITAL COMPUTER

Donald A. Harrison, Poughkeepsie, N.Y., and James J. Selfridge, Pacific Palisades, Calif., assignors to International Business Machines Corporation, New York, N.Y., a corporation of New York

Filed Aug. 5, 1958, Ser. No. 753,342
16 Claims. (Cl. 235—153)

This invention relates generally to error detection systems for electronic digital computers and in particular it relates to the detection of errors in arithmetic processes by means of computed parity bits.

It is an object of the invention to provide an error detection system which requires a minimum of equipment in addition to that necessary to implement arithmetic functions.

It is another object to apply the odd or even parity principle to arithmetic processes.

It is a further object to provide an error detection system especially adapted from a reliability standpoint to check computations involving repetitive arithmetic processes carried out at high speed.

A still further object of the invention is to provide an error detection system whereby a computing operation can be terminated at the stage where an error has occurred and the stage identified so that operations can be continued from that point, once corrective measures have been taken.

In brief, the present invention contemplates the computation of the parity for the answer to an arithmetic process on the basis of the parities of the operand digits from which the answer is computed and digits other than operand digits entering and leaving the register in which the answer is stored. The invention is applicable to the arithmetic processes of addition, subtraction, multiplication and division and will be described, by way of example, in connection with the digital computer disclosed in the copending application of Morton M. Astrahan et al. Ser. No. 612,265, filed September 26, 1956. In the arithmetic element of this computer there is already provision for checking transfer functions by means of parity bits assigned to the respective storage registers. The parity bit assigned is a one when the number of ones in a word is even to make odd the parity count of a register as a whole. Conversely, when the number or word is odd, a zero or even parity bit is assigned to keep odd the sum of the one digits, assuming there has been no malfunction.

To supplement this scheme of checking transfer functions, parity bits are assigned according to the invention on the basis of whether the correct answer to an arithmetic process is odd or even. In the processes of addition and subtraction, this determination is based on the logic that the correct answer parity is equal to the sum of the parities of the operands and of the carries. That is to say with respect to the carries, it is the aggregate number or sum thereof, whether odd or even, that determines their parity. In the process of multiplication, the determination of the parity that the product should have is based on the logic that the parity of the sum of all the carries that take place during the individual multiplying steps is the correct parity except when the multiplier and multiplicand are both odd. In this case, the parity of the correct answer is the opposite of that resulting from a count or summation of the carries alone. In division, the determination of the parity of the quotient is somewhat more complicated because of the illustrative way in which the divide process is carried out. However, the invention can be applied to any arithmetic element irrespective of its organization and the manner in which it operates.

The novel features of the invention together with further objects and advantages thereof will become more readily apparent from the following detailed description and the accompanying drawings to which it refers wherein the lines with conventional arrowheads carry pulses and those with diamond-shaped terminations carry D.C. levels at selected times. In the drawings.

Figure 1:
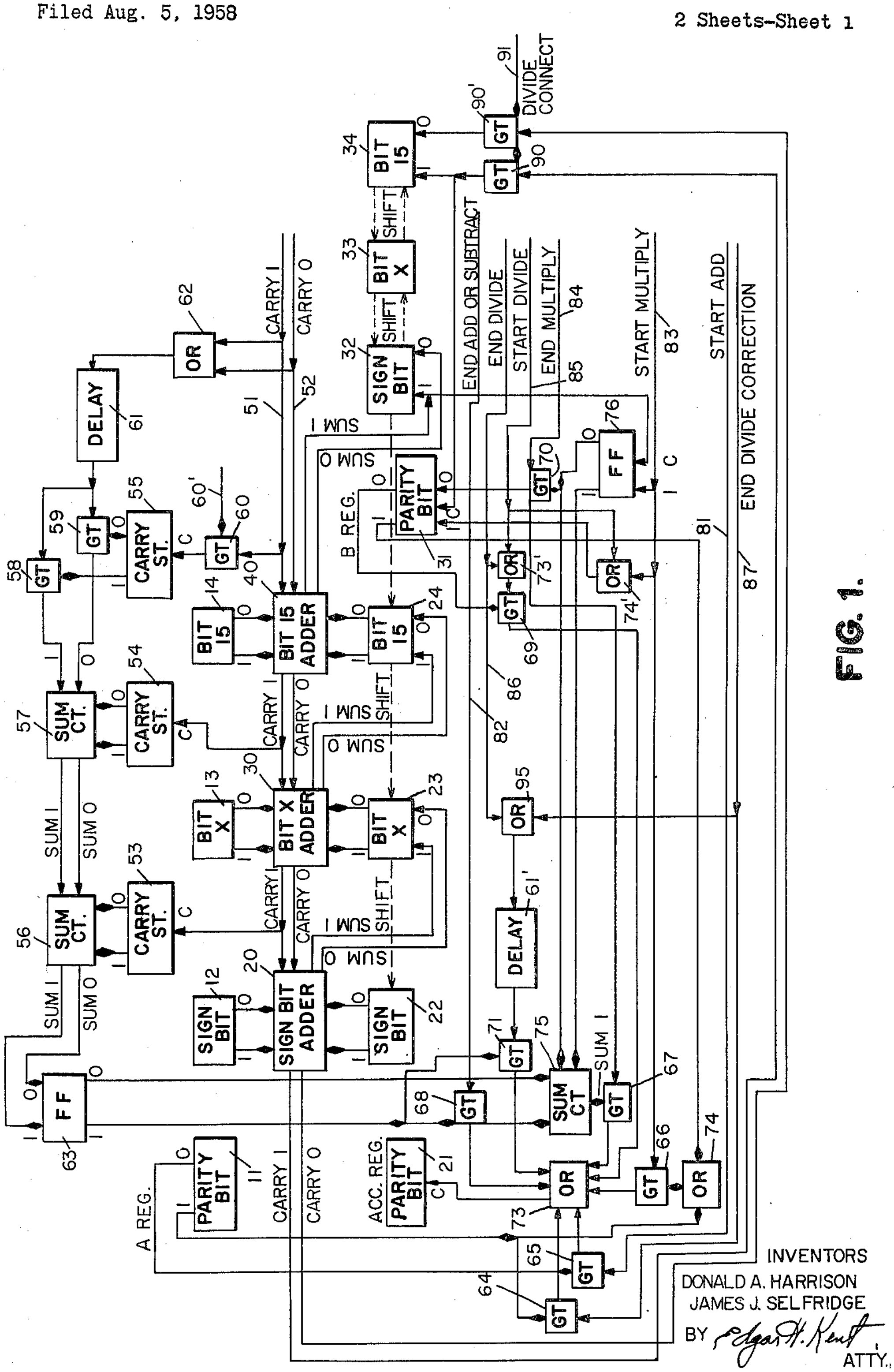
FIG. 1 is an overall block diagram of the error detection system according to the invention.

As shown in FIG. 1, the arithmetic element to be checked according to the invention comprises an A register, a B register and an accumulator register, together with an adder that operates on digits held in the accumulator and A registers. Each register is adapted to hold fifteen bits exclusive of a sign bit and a parity bit. In the A register the parity bit is stored in a flip-flop 11, the sign bit is stored in a flip-flop 12, and bit 15 is stored in a flip-flop 14. Storage for intermediate bits 1 through 14 is represented by a single bit X flip-flop 13 to simplify the drawing. Similarly, the accumulator register has a parity bit flip-flop 21, a sign bit flip-flop 22, a bit X flip-flop 23, a bit 15 flip-flop 24; and the B register has a parity bit flip-flop 31, a sign bit flip-flop 32, a bit X flip-flop 33, and a bit 15 flip-flop 34. The adder is comprised of 16 stages represented in the drawing by a sign bit stage 20, a bit X stage 30 corresponding to stages 1 through 14, and a bit 15 stage 40. As disclosed in the aforementioned copending application, the adder is of the ripple type, each stage having carry one and carry zero output lines in addition to its sum lines 1 and 0.

The sum lines from the sign bit adder stage 20 are connected to the input terminals of the bit 1 accumulator flip-flop; the sum lines from the bit 2 adder stage are connected to the input terminals of the bit 2 accumulator flip-flop, and so forth in order to produce an automatic shift right of an accumulated sum. This simplifies a multiplication process at the expense of additive processes for which provision is made to shift the digits in the accumulator register to the left, thereby to counteract the effect of the automatic shift right. The B register sign bit is shiftable to the left in concert with the accumulator register in this mode of operation of the registers, the sign bit of the B register being entered into the bit 15 flip-flop of the accumulator register. By virtue of this fact and the fact that the sum from the bit 15 adder stage is entered into the sign bit flip-flop of the B register, the accumulator register and the B register sign bit can be regarded as a single unit under certain operating conditions, the B register sign being stored to make room for the output of the bit 15 adder stage. To initiate operation of the adder, a pulse is entered into the bit 15 adder stage by way of a carry one line 51 or a carry zero line 52, depending upon the nature of the process to be performed.

According to the invention there is provided still another register comprised of sixteen flip-flops for storing indications of carries. Of these, flip-flops 1 through 14 are characterized by an X carry storage element 53, flip-flop 15 is characterized by a carry storage element 54, and flip-flop 16 by a carry storage element 55. These latter storage elements or flip-flops are similar to the parity bit flip-flops 21 and 31 in that they have operatively connected complementing inputs. Storage element 55 has as its input carry one pulses applied to the bit 15 adder stage on line 51, carry storage element 54 has as its input carry ones produced by the bit 15 adder stage, and storage element 53 has as its input carry ones produced by the bit X adder stage. In other words, the respective flip-flops characterized by the storage elements 53–55 serve as modulo 2 counters of the individual carries to the adder stages. Due to the fact, however, that the carry one pulses on line 51 are not counted during a division process, they are applied to storage element 55 through a gate 60 conditioned by a level on line 60′. This level is up for all processes but division.

Connected to the outputs of the storage elements 53–55 and to one another are summing circuits 56 and 57 which serve to develop an indication of the sum of the carry ones as odd or even. Sum circuit 57 has a first pair of inputs (one and zero) which are served by the corresponding output lines from the storage element 54, and a second pair of inputs (one and zero) to which carry one and zero pulses on lines 51 and 52 are gated selectively, depending upon the binary digit standing in the storage element 55. The gating function is performed by two gates 58 and 59, the first of which is conditioned by the one output of the storage element 55 to pass a pulse from either of the lines 51 or 52 to the one input of the sum circuit 57. Gate circuit 59 is conditioned by the zero side of storage element 55 to pass a pulse from either of the lines 51 or 52 to the zero input of sum circuit 57. The pulse is applied to the gate circuits by way of a delay element 61 and an OR circuit 62 connected to the lines 51 and 52. Sum circuit 56 likewise has a pair of one and zero inputs, one of which pairs comprises the one and zero outputs of the carry storage element 53, and the other of which comprises the sum one and zero outputs of the sum circuit 57. The outputs of the sum circuit 56 are applied to the one and zero inputs of a flip-flop 63 which represents the sum of the carry ones as being odd or even.

Additionally there are provided according to the invention gate circuits 64–71, OR circuits 73 and 74, a sum circuit 75, and a flip-flop 76. The interrelation of these elements, as shown in the drawing, will become more readily apparent from the following description of the operation of the system according to the present invention.

In operation, an add process is begun by clearing the various registers and entering in the accumulator register the augend, and in the A register the addend. Those skilled in the art will recognize that suitable clear and input lines (not shown) are used for this purpose as shown in detail in the aforementioned copending application. Entered along with the addend and the augend are their parity bits which will be zero in the case where these operands have an odd number of ones. In this way, the number of ones stored in the individual flip-flops of each register as a whole including its parity flip-flop is caused to be odd. Conversely, if either the addend or augend has an even number of ones, then its corresponding parity bit entered in the A register or accumulator register, respectively, together with the number will be a one.

After the addend and augend have been entered with their corresponding parity bits, a start add pulse is applied to a line 81 which senses the gate 65. Gate 65 is conditioned by the zero side of the A register parity flip-flop 11 so that if the addend is odd, as represented by a zero parity bit, a pulse is passed to the complement input of the accumulator parity flip-flop 21 by way of the OR circuit 73. If on the other hand, the A register parity bit is a one, representing that the addend is an even number, no change of the accumulator parity bit will be produced since there is no link in an add process between the one side of the A register parity flip-flop 11 and the input of the accumulator parity flip-flop 21. The net result is, therefore, that at the start of an add process, a parity is tentatively assigned to the accumulator register which reflects the sum of the parities of the addend and augend. This will be the correct parity for the sum developed by the adder save for the effect of the carries (carry ones) generated during the add process. If the total number of carry ones, as determined by the carry storage elements 53 and 54, and the summing circuits 56 and 57, is odd then flip-flop 63 will be set to the one state which conditions the gate 68. Gate 68 is sensed by a pulse applied to line 82 at the end of an add process and as a result, a pulse is passed to the complement input of the accumulator parity flip-flop 21, by way of OR circuit 73 to change its state. This is as it should be to finally determine the parity bit for the correct answer in the accumulator. Conversely, if the total number of carry ones is even, as represented by flip-flop 63 standing in the zero state, then no change of the accumulator bit is produced. The automatic shift right of the sum digits or bits including bit 15 which is passed to the B register has no effect on the parity assigned to the accumulator register since the automatic shift right is followed by a correctional shift left which places all of the sum digits in the accumulator register. It remains, therefore, only to take a parity count of the actual digits in the accumulator register representing the sum and compare the parity determined by count with the pre-assigned or computed parity determined according to the invention. This can be done with the conventional parity checking apparatus described in detail in the aforementioned copending application or as outlined hereinafter in connection with FIG. 4.

The foregoing explanation is equally applicable to a subtract process since subtraction is carried out in the same manner as addition with the minuend in the accumulator register and the ones complement of the subtrahend in the A register. In the process of multiplication, the multiplicand is held in the A register and the multiplier is held in the B register. The first partial product that is formed is entered by the adder into the accumulator register stages and the sign bit of the B register. In effect, successive partial products, because of their increasing word length, are expanded into so much of the B register as is required to hold them, room being made therefor by a shift out of the B register of the multiplier bits that have already been used and are no longer needed. This makes a determination of the parity for the correct answer or product more complicated because the end result that is desired is a parity for the accumulator register and a parity for the B register instead of a single parity representing the product. With particular reference once again to FIG. 1, flip-flop 76 which has its complement input connected to the sum one line from the bit 15 adder stage, serves to perform a parity count of the bits of the partial products that are expanded or shifted into the B register. Fil-flop 76 is set to one at the start of a multiplication process by means of a pulse on the line 83, which pulse is also transmitted by OR circuit 74′ to set the B register parity flip-flop 31 to one unconditionally. The accumulator parity flip-flop 21, on the other hand, is in a zero state at the start of the multiplication process owing to the fact that the entire accumulator is cleared at the start of the multiplication process. This is in a sense the reverse of what is done with the B register parity flip-flop and the flip-flop 76 for the reason that the multiplicand digits will all be shifted out of the B register by the end of the multiply process in favor of digits representing the resultant product. If none of these digits are ones, the B register parity flip-flop will remain at one, which is as it should be to represent an even number (all zeros) in the B register. For each one digit of the product that is shifted into the B register, however, flip-flop 76 is complemented so that in effect it serves as a modulo 2 counter of these one digits. If the sum of these one digits is odd at the end of the multiply process, flip-flop 76 will be in a zero state and hence effective to condition the gate 70. Gate 70 is sensed by a pulse on a line 84 thereby to reset the B register parity flip-flop to zero, which correctly represents an odd number of ones in the B register. Conversely, if the sense of the total number of one digits shifted into the B register is even, no change in the state of the B register parity flip-flop is produced, just as if all of the digits having been shifted into the B register were zeros.

The parity for the accumulator register is determined according to the invention on the basis of the automatic shifts into the B register together with the parities of the multiplier and multiplicand. When the A and B register parity bits are both one at the start of the multiply process, representing that the multiplicand adn multiplier numbers are both even, gate 66 is effective to pass the start multiply pulse on line 83 to the complement input of the accumulator parity flip-flop 21 because gate 66 will be conditioned by levels obtained from the one sides of the parity flip-flops 11 and 31. As a consequence, the accumulator parity flip-flop will be complemented once and only once at the start of the multiply process to change the accumulator parity bit from zero to one. This indicates tentatively that the portion of the final product stored in the accumulator should be even if the process has been carried out correctly. As is apparent, the same result will follow when there is a one in either but not both of the A and B register parity flip-flops, which is as it should be since the only combination that leads to a different result is a multiplicand and multiplier in the A and B registers that are both odd. In this case, the accumulator parity bit is unchanged and remains a zero.

To determine finally the parity of the number in the accumulator register at the end of the multiply process, it is necessary to take account of the carries that take place during the formation of partial products and of the automatic shifts of digits from the accumulator to the B register produced by the adder. The shifts may be regarded in the following way. For each one that is shifted out of the accumulator, the parity must be changed since it is to represent the correct parity for only that portion of the product held in the accumulator. The flip-flop 76 which counts in modulo 2 form the total number of ones shifted into the B register also represents the number of ones shifted out of the accumulator register since these two numbers are the same. If an even number of ones is shifted out of the accumulator register, then at the end of the multiply process flip-flop 76 will be in a one state, the state to which it was set initially. Conversely, the flip-flop 76 will stand at zero when there has been an odd number of one shifted out of the accumulator register. As regards the carries, flip-flop 63 indicates according to its state, the total number of carry ones that have been generated in the process just as in the case of an addition process. That is to say, a product is formed by successive add operations with the multiplicand so that the carry storage elements 53–55 and the summing circuits 56 and 57 work as before except that they determine repetitively the sense of the total carries as odd or even, once for each add operation or partial product. Thus, in a multiply process flip-flop 63 serves as a modulo 2 counter of the carries in similar manner as flip-flop 76 serves for the shifts. In one and only one of the flip-flops 63 and 76 stands at one at the end of a multiply process, indicating that the combined effect of the carries and of the shifts is odd, then a sum one level is produced by the summing circuits 75 to condition the gate 67. Gate 67 is sensed by the pulse on the line 84 at the end of the multiply process and in response thereto passes a pulse to the accumulator parity flip-flop 21 by way of OR circuit 73 to complement it. Conversely, if both the flip-flops 63 and 76 stand at zero or one at the end of the multiply process, there will be no sum one level produced by sum circuit 75 and as a consequence the accumulator parity flip-flop 21 will retain the setting it was given at the time of the pulse on the line 83.

The determination of the parities that the accumulator and B register should have at the end of a divide process is made with substantially no more circuit elements than are used in connection with a multiply process but the logic of the operation is somewhat more complicated. This is because various factors that enter into the parity computation in a divide process cancel one another on the basis of their combined effects. In a divide process, a separate parity is computed for the B register and for the accumulator register just as in the case of the multiply process. The mode of determining the parity to be assigned to the B register parity flip-flop is the simplest to understand and will be explained first.

Initially, the state of the B register parity flip-flop is determined by the sense of the number of ones as odd or even which is entered into the B register to represent a portion of the dividend. The remaining portion of the dividend is in the accumulator register, and the divisor is in the A register. Quotient digits produced by means of successive subtractive operations with the divisor are entered into the B register from the sign bit adder stage by way of the bit 15 flip-flop 34 of the B register. Concurrently, the dividend digits in the combined accumulator and B registers are shifted to the left to make room for the quotient digits, with a resultant overflow from the accumulator sign bit flip-flop 22 of dividend digits that are no longer needed. In response to a pulse on the line 85 applied by way of OR circuit 74' at the start of the divide process, the B register parity flip-flop 31 is set to one, unconditionally nullifying the parity bit entered therein with the transfer to the B register of its portion of the dividend. The reason is that but for the ones entered into the B register, by way of its bit 15 flip-flop 34 to represent the quotient, the flip-flops of the B register would all stand at zero at the end of the divide process because the original contents of the B register will be shifted out into the accumulator register. All zeros correspond to an even number from a parity standpoint and is represented by a parity bit of one in the parity flip-flop 34. The only thing that will have an effect on the B register parity bit, therefore, is the entering into the B register by way of its lowest order the carry ones from the sign bit adder stage representing the individual bits of the quotient. The effect of these carry ones or digits is accounted for by the interconnection of the one input to the bit 15 flip-flop of the B register and the complement input of the B register parity flip-flop. By virtue of this connection, the B register parity flip-flop which was set to one, is complemented as many times as ones are entered into the B register. The net result is that at the end of the divide process the state of the B register parity flip-flop will correctly represent the parity of the number corresponding to the quotient held in the B register.

Several factors determine the manner in which the accumulator parity flip-flop is controlled so that its state will correctly represent the parity of the remainder at the end of the divide process. Initially the accumulator parity bit represents the parity of the number corresponding to that portion of the dividend which is entered into the accumulator. However, all of the digits in the accumulator are replaced by the initial contents of the B register in the course of the divide process so that at the very start of the process the accumulator parity flip-flop is complemented if the B register parity flip-flop initially contains a zero. Thus the gate 69 is conditioned by the zero side of the B register parity flip-flop to pass a pulse on the line 85 to accumulator parity flip-flop 21 by way of OR circuits 73 and 73'. The logic of this operation is that when the parity of the B register is zero, this means that an odd number, namely the number in the B register, will be shifted into the accumulator register by the end of the process which requires a change in the parity of the latter. Conversely, when the B register number is even, no change of the accumulator parity is required since the introduction of an even number has no effect on the existing parity.

Another factor that has an effect on the accumulator parity is the shift out of the accumulator register or overflow of digits to make room for the digits from the B register. However, the effect of this overflow is counteracted by the carry (zero or one) into the bit 15 adder stage. That is to say, in the nature of the divide process if an overflow of one occurs from the accumulator sign bit, a carry zero will be generated and entered into the bit 15 adder stage to initiate the next partial quotient operation and, conversely, if an overflow of zero occurs a carry one will be entered in the bit 15 adder stage. The net parity of the overflow digits leaving the sign bit of the accumulator and the carries into the bit 15 adder stage is, therefore, odd for each combination of partial quotient and combined shift left operations. Since the partial quotient operation is performed an even number of times, the overflow may be neglected if carry ones into the bit 15 adder stage are neglected as well. The deconditioning of gate 60 during the divide process insures this latter result.

The carries generated within the adder during the partial quotient process are stored in the carry storage register and after completion of the divide process, if the sum of these carries is even the accumulator parity will not be affected. If the total of these carries is odd, the accumulator parity flip-flop must be complemented. To accomplish this result, the accumulator parity flip-flop is complemented on the basis of the parity indication produced by the flip-flop 63. Thus, it is the one output of flip-flop 63 that is effective to complement the accumulator register parity flip-flop when the gate 71 is sensed by a pulse on the line 86, the delay element 61' functioning merely to stay this complementing operation pending completion of the operation described in the following paragraph. In other words, flip-flop 63 in combination with sum circuits 56 and 57, and the storage elements 53, 54 is adapted to reflect as odd or even the total number of carries generated in the course of the divide process just as in the other processes. It follows that if the total number of carries from all but the sign bit adder stage is odd, then the accumulator parity flip-flop is complemented but not otherwise.

Another factor that must be taken into account in the determination of the correct parity for the accumulator register is the carries from the sign bit adder. Every one carry from the sign bit adder complements the B register parity flip-flop so that as aforementioned, the B register parity flip-flop acts as a modulo 2 counter of one carries from the sign bit adder. Upon completion of the division process, if the B register parity flip-flop is at zero, the accumulator parity is complemented since this indicates an odd number of such one carries has occurred. If the B register parity is set to one, the accumulator parity will be correct since this indicates an even number of carries has occurred. The mechanism for complementing the accumulator parity flip-flop on this basis is the pulse on the line 86 which is applied to gate 69 by way of OR circuit 73' and passed by gate 69 when the B register parity flip-flop stands at zero through OR circuit 73.

At the end of the divide process the accumulator parity bit will now correctly reflect the parity of the contents of the accumulator unless a correction of the remainder is necessary. The nature of the divide process does not permit a negative remainder. Therefore, after completion of the process, if the accumulator is negative, the divisor is again added to the accumulator number without an accompanying shift. This final addition is initiated by a carry zero into the bit 15 adder stage which will have no effect from the standpoint of parity. However, in the course of this addition, there will occur a carry one from the sign bit adder stage which necessarily results from the magnitude and sense (sign) relation between the numbers that are added, and which evidences the change from negative to positive of the sign of the remainder in the accumulator register. Since it does not represent a quotient bit, this carry one is not passed to the bit 15 or parity flip-flops 34 and 31 of the B register as are the other carries from the sign bit adder generated in the course of the previous partial quotient operations. To prevent the passage of this carry one, there is provided a gate 90 which is connected between the carry one output from the sign bit adder and the one input to the flip-flop 34 and which is conditioned by a divide connect signal on a line 91. The signal is present to condition the gate 90 as well as a gate 90' for the carry zero line only during partial quotient operations.

Because it does reflect a parity change of the number in the accumulator register, namely the change from one to zero of the sign bit, this carry one is taken into account through examining the parity of the divisor. That is to say with respect to the divisor, its parity now becomes significant because it has again been added to the accumulator number, making odd the total number of times that such an addition (whether in regular or complement form) has taken place. Hence, the accumulator parity flip-flop is complemented or not according to the sense of the A register parity, a pulse on line 87 being passed to the accumulator parity flip-flop 21 by the gate 64 to accomplish this result. Gate 64 is conditioned by the one output of the A register parity flip-flop 11 instead of the zero output as it otherwise would be to take account only of the A register parity. By means of this effective reversal of the sense of the relation between the A register parity and the accumulator parity, there is caused to take place in one operation the determination of the accumulator parity on the basis of the A register parity and the aforementioned carry one to which the system is not otherwise responsive. It remains, therefore, only to take into account the internal carries from all but the sign bit adder stage. This is also done in response to the pulse on line 87 which is passed by OR circuit 95, and delay element 61', to the gate 71. When the gate 71 is conditioned by the one output of flip-flop 63 representing an odd number of carries, the pulse is passed on through OR circuit 73 to the complement input of the accumulator parity flip-flop to change its state.

The accuracy of the division process can now be checked in like manner, as in a multiplication process, namely by means of a parity count of both the accumulator and B registers. If either register as a whole, including its parity stage, has an even number of ones, then an incorrect number therein is indicated since the computed parity bits assigned according to the invention are adapted always to insure an odd number of ones when combined with the correct numbers for the registers.

Figure 2:
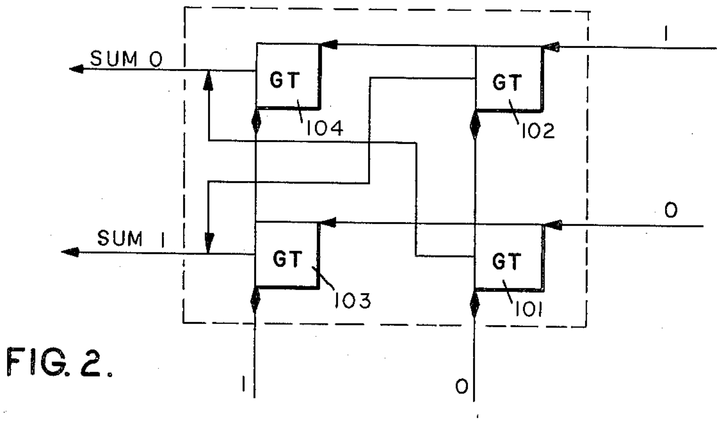
FIGS. 2 and 3 are more detailed block diagrams of certain summing circuits shown in block form in FIG. 1.

In FIG. 2 there is shown in more detail a summing circuit corresponding to either of the summing circuits 56 and 57 of FIG. 1. By way of example, the circuit of FIG. 2 may be taken to represent the summing circuit 57 of FIG. 1 which has as inputs the one and zero output lines from carry storage flip-flop 54 and the output lines from gate circuits 58 and 59. The summing circuit is formed with four gate circuits 101–104. Gate circuits 101, 102 are conditioned by the zero output line from element 54, and gate circuits 103, 104 are conditioned by the corresponding one line. Gates 102 and 104 are sensed by a pulse from gate 58 representing a carry one, and gates 101 and 103 are sensed by a pulse from gate 59 representing a carry zero. When both a one level and carry one pulse are present or when both a zero level and a carry zero pulse are present, a pulse is passed by the circuit to the common output line from gates 104 and 101 corresponding to a sum zero. Conversely, when either, but not both, a one level and a carry one pulse are present, a pulse is passed by the common output line from gates 103 and 102 corresponding to a sum one. The specific kind of gates used for this circuit is not material to the principle of the invention although it is preferred to use multigrid electron tube gates which are adapted to operate at relatively high speed.

Figure 3:
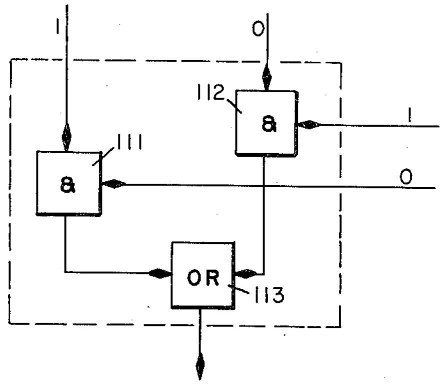

In FIG. 3 there is shown in more detail the summing circuit 75 of FIG. 1. This summing circuit may conveniently comprise a pair of AND circuits 111 and 112, and an OR circuit 113, each being of the conventional diode type. AND circuit 111 has as inputs the zero output line from the flip-flop 76 and the one output line from flip-flop 63 in FIG. 1. AND circuit 112 has as inputs the one output line from the flip-flop 76 and the zero output from the flip-flop 63. The outputs from the AND circuits 111 and 112 are combined in an OR circuit 113 to produce a single output level corresponding to a sum one. Thus, when both of the flip-flops 63 and 76 are standing in the same state, whether it be one or zero, there will be no output level developed by OR circuit 113. Conversely, when either but not both of these flip-flops are standing at one, OR circuit 113 provides an output level to condition gate 67 in FIG. 1, which level logically corresponds to a sum one.

Figure 4:
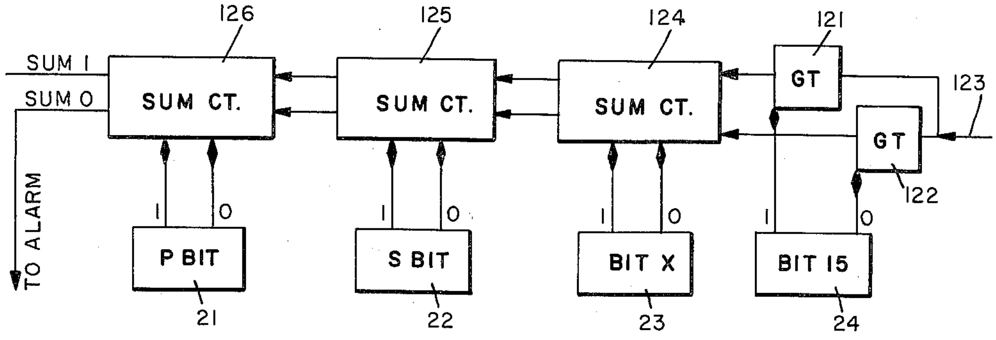
FIG. 4 is a block diagram of apparatus for performing a parity count.

In FIG. 4 there is shown an arrangement suitable for performing a parity count of the digits in either the accumulator register or the B register of FIG. 1. By way of example, only the flip-flops 21–24 have been shown in FIG. 4 to represent the accumulator register but it will be appreciated that the individual B register flip-flops may be separately arranged in like manner as the accumulator register flip-flops. Thus, the one output from the bit 15 flip-flop 24 serves to condition a gate 121, and the corresponding zero output serves to condition a gate 122. Gates 121 and 122 are sensed by a pulse on a line 123 when a parity count is desired. The output lines from the gates 121 and 122 are applied as inputs to a summing circuit 124 as are the one and zero output lines from the bit X flip-flop 23. Summing circuit 124 has a pair of output lines which comprise inputs to a summing circuit 125 of like character, the output lines from summing circuit 125 being applied to a like summing circuit 126. Summing circuit 125 also has as inputs the one and zero output lines from the sign bit flip-flop 22, and summing circuit 126 has as additional inputs the one and zero output lines from the parity bit flip-flop 21. Although there are two output lines from summing circuit 126, as in the case of summing circuits 124 and 125, only one of these need be used, namely the sum zero output line to indicate a malfunction in terms of an even parity count. Summing circuits 124–126 are the same as summing circuits 56 and 57 of FIG. 1, which are likewise served by a pair of gates. It will be readily apparent, therefore, that the circuit of FIG. 4 operates to count parity of the accumulator register digits in like manner as the parity of carry digits in flip-flops 53–55 (C register) are counted in FIG. 1. This same circuit can also be employed to count parity of a number in the A or B register representing an operand. Sum circuit 126 which is responsive to the parity bit flip-flop 21 would be omitted in this case, the output lines from sum circuit 125 serving to provide the desired parity indication in the form of pulses suitable for control of the initial state of the parity flip-flop of the register whose parity is counted.

Those skilled in the art will appreciate that the invention is by no means limited to the details of what has been illustrated and described in the foregoing by way of example since the specific manner in which the invention is applied will depend a great deal on the nature of the arithmetic element to be checked.

We claim:

1. In a digital computer, including a register to store a number representing at least a part of the answer to an arithmetic process involving the manipulation of at least two operands, a system for detecting errors in the process performed by the computer, said system comprising means to determine the parities of the numbers representing the operands from which the answer is computed, means to count the parities of digits other than operand digits entering and leaving said register in the course of the arithmetic process, means to compute the parity of the answer as a function of the parities of the numbers representing the operands and the parity determined by said counting means, and means to compare the computed parity with the parity of the digits in said register representing the answer resulting from the arithmetic process.

2. An error detection system as claimed in claim 1 wherein said counting means includes a modulo 2 counter responsive to digits of a predetermined sense entering said register in the course of the process.

3. An error detection system as claimed in claim 1 wherein said counting means includes a modulo 2 counter responsive to digits of a predetermined sense leaving said register in the course of the process.

4. An error detection system as claimed in claim 1 wherein said parity computing means includes logical circuitry which functions selectively according to the kind of arithmetic process performed by the digital computer.

5. An error detection system as claimed in claim 1 wherein said counting means includes a group of bistable devices to store digits representing carries generated in the process.

6. An error detection system as claimed in claim 5 wherein said counting means further includes circuitry to derive from the digits representing carries a single binary digit indicative of the sense of the sum of said digits as odd or even.

7. In a digital computer including a register to store a number representing at least a part of the answer to an arithmetic process, a system for detecting errors in the process performed by the computer, said system comprising means to determine the parities of the numbers representing the operands from which the answer is computed, means to produce a parity indication as a function of the parities of the numbers representing the operands, means to count the parity of digits of a predetermined sense that are shifted with respect to said register as a part of the process, means to count the parity of digits representing carries generated in the process, means to alter the sense of the parity indication as a function of the sense of the parity count of shifted digits as odd or even and of the sense of the parity count of the carry digits, and means to compare the said parity indication with the parity of the digits in said register representing the answer to the process.

8. In a digital computer, including a register to store a number representing at least a part of the answer to an arithmetic process involving the manipulation of at least two operands, a system for detecting errors in the process performed by the computer, said system comprising means to determine the parities of the numbers representing the operands from which the answer is computed, means to count the parities of digits other than operand digits entering and leaving said register in the course of the arithmetic process, means to compute the parity of the answer as a function of the parities of the numbers representing the operands and the parity determined by said counting means, means to enter into said register a digit representing the computed parity, and means to count the parity of the digits in said register.

9. In a digital computer including a register to store a number representing at least a part of the answer to an arithmetic process involving the manipulation of at least two operands, a system for detecting errors in the process performed by the computer, said system comprising means to determine the parities of the numbers representing the operands from which the answe is computed, means to enter a digit in said register as a function of the parities of the numbers representing the operands, means to count the parity of digits of a predetermined sense that are shifted with respect to said register as a part of the arithmetic process, means to count the parities of the digits representing carries generated in the arithmetic process, means to alter said first-named parity digit as a function of the sense of the parity count of the shifted digits as odd or even and of the sense of the parity count of carry digits, and means to count the parity of the digits in said register.

10. In a digital computer including a register to store a number representing at least a part of the answer to a multiplication process, a system for detecting errors in the process performed by the computer, said system comprising means to determine the parities of the operands from which the answer is computed, means to count the parity of digits representing carries generated in the process of computing the answer, means to produce a parity indication as a function of the parities of the operands and of the digits representing carries, and means to compare said indication with the parity of the digits in said register representing the answer to the process.

11. In a digital computer including a register to store a number representing at least a part of the answer to a multiplication process, a system for detecting errors in the process performed by the computer, said system comprising means to produce a parity indication of one sense when the parity of either the multiplier or multiplicand is even and a parity indication of opposite sense when the parity of both is odd, means to count the parity of digits representing carries generated in the process, means selectively to change said parity indication according to the parity count of the carries, and means to compare said indication with the parity of the digits in said register representing the answer to the process.

12. In a digital computer including a register to store a number representing at least a part of the answer to a multiplication process, a system for detecting errors in the process performed by the computer, said system comprising means to produce a parity indication of one sense when the parity of either the multiplier or multiplicand is even and a parity indication of opposite sense when the parity of both is odd, means to count the parity of the digits representing the answer that are not entered in said register, means to count the parity of digits representing carries generated in the process, means to change said parity indication when one and only one of said parity counts is of a predetermined sense, and means to compare said indication with the parity of the digits in said register representing the answer to the process.

13. In a digital computer including a register to store a number representing at least a part of the answer to a multiplication process, a system for detecting errors in the process performed by the computer, said system comprising means to enter in said register a digit of one sense when the parity of either the multiplier or multiplicant is even and of the opposite sense when the parity of both is odd, means to count the parity of digits representing the answer that are not entered in said register, means to count the parity of digits representing carries generated in the process, means to alter the sense of said parity digit when one and only one of said parity counts is of a predetermined sense, and means to count the parity of the digits in said register.

14. In a digital computer including a register to store a number representing at least a part of the answer to a division process, a system for detecting errors in the process performed by the computer, said system comprising means to count the parity of the digits representing carries generated in the process, means to poduce a parity indication as a function of the parity determined by count and the parity of the divisor when the divisor is subtracted from the dividend an odd number of times, and means to compare said indication with the parity of digits in said register representing the answer to the process.

15. In a digital computer including a register to store a number representing at least a part of the answer to a division process, a system for detecting errors in the process performed by the computer, said system comprising means to produce a parity indication as a function of digits to be shifted into said register, means to count the parity of carries generated in the process, means to count the parity of digits shifted out of said register, means to determine the parity of the divisor, means to alter said parity indication as a function of said parties determined by count and of the parity of the divisor, and means to compare said indication with the parity of the digits in said register representing the answer to the process.

16. In a digital computer including a register to store a number representing at least a part of the answer to a division process, a system for detecting errors in the process performed by the computer, said system comprising means to enter in said register a digit representing in sense the parity of digits to be shifted into said register, means to count the parity of digits representing carries generated in the process, means to count the parity of digits shifted out of said register, means to determine the parity of the divisor, means to alter the sense of said parity digit as a function of said parties determined by count and the parity of the divisor, and means to count the parity of the digits in said register.

References Cited in the file of this patent

UNITED STATES PATENTS

| | | |
|---|---|---|
| 2,634,052 | Block | Apr. 7, 1953 |
| 2,837,278 | Schreiner et al. | June 3, 1958 |
| 2,954,164 | Schreiner et al. | Sept. 27, 1960 |
| 2,957,626 | Havens et al. | Oct. 25, 1960 |

OTHER REFERENCES

Richards: Arithmetic Operations in Digital Computers, D. Van Nostrand Co., Inc., New York (March 1955), pp. 220–225.